Nov. 26, 1929.  T. P. LOHRMAN  1,736,856
CONSTRUCTION OF CLOSED VEHICLE BODIES
Filed Feb. 8, 1926
Fig. 1.
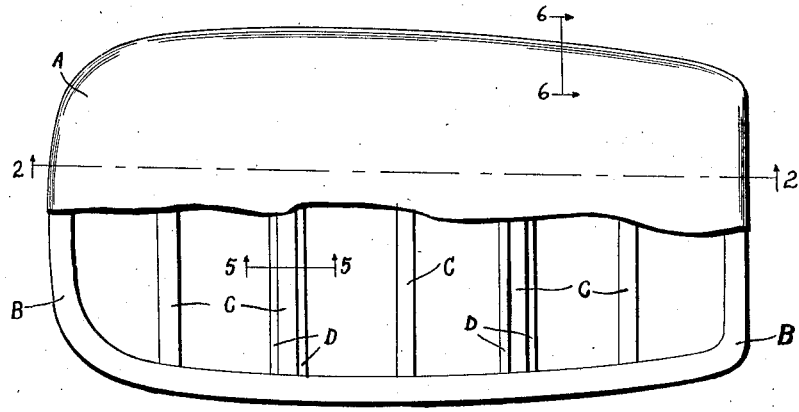
Fig. 2.
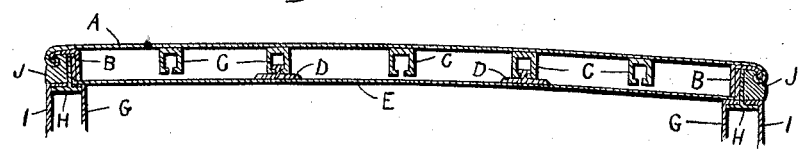
Fig. 3.       Fig. 4.       Fig. 5.
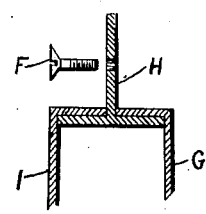 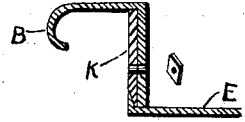 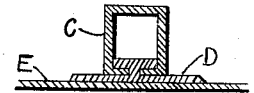
Fig. 6.
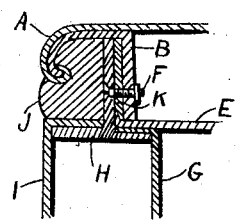
INVENTOR
Thomas Paul Lohrman Patented Nov. 26, 1929

1,736,856

UNITED STATES PATENT OFFICE

THOMAS PAUL LOHRMAN, OF DETROIT, MICHIGAN

CONSTRUCTION OF CLOSED VEHICLE BODIES

Application filed February 8, 1926. Serial No. 86,837.

This invention relates to improvements in closed vehicle bodies, and particularly in the roof construction therefor.

With closed vehicle bodies, as now constructed, the roof frame is composed of side and end rails of wood. The deck covering is attached to the roof by tacking said covering to the wooden framework, the interior trimming also being secured to the roof frame by tacking said trimming to the inner surface of the roof frame.

One objection to the present type of construction is due to the wooden framework, as the wooden members shrink, causing loose joints in the framework, thereby developing undue noises and various other troubles.

With the present invention, a structure is provided whereby the interior trimming as well as the deck covering can be readily attached to an all-metal framework.

While the present invention relates to a closed vehicle body having detachable roof frame for the purpose of mounting the headlining to said detachable roof frame previous to mounting said roof frame within the body frame, I do not claim such a detachable roof frame as part of the present invention, as I have previously filed an application on Sept. 26, 1925, Serial No. 58,715, claiming such a detachable roof frame, but the present invention provides means for constructing said detachable roof frame of suitable metal material, in conjunction with means for attaching the headlining to such an all-metal detachable roof frame, previous to mounting said roof frame within the body frame.

In conjunction with the present invention, the deck covering is mounted to the roof frame by securing a flexible strip of material to the outer edge of the deck covering, said deck covering being mounted to the roof frame by attaching said flexible strip of material within a suitable metal channel, said channel being secured to the outer edge of the roof frame. I do not claim as part of the present invention, such means for mounting the deck covering to the roof frame, as such means have been claimed by myself in an application filed Dec. 1, 1925, Serial No. 72,452, but the present invention provides a structure whereby the outer frame-forming rail of the detachable roof frame is so constructed as to form the upper portion of the said metal channel, and the stationary metal frame forming rail secured to the body frame at the upper side thereof, being so formed to provide the lower portion of the said metal channel.

To provide such a structure, afford the advantages and overcome the difficulties mentioned, is an object of the present invention.

Other objects will appear hereinafter.

The invention consists in the combination and arrangement of parts hereinafter described and claimed.

The invention will be best understood from a reference to the accompanying drawings, which form a part of this application, and in which, Fig. 1 is a top plan view of the roof frame with a portion of the deck covering removed, Fig. 2 is a sectional view, taken on substantially line 2—2 of Fig. 1, Fig. 3 is a sectional view of the frame-forming rail mounted at the upper side of the body, showing a portion of the outer body panel and a portion of the interior trimming attached thereto, Fig. 4 is a sectional view of the frame-forming rail of the detachable roof frame, with a portion of the headlining attached thereto, Fig. 5 is a sectional view, taken on substantially line 5—5 of Fig. 1, Fig. 6 is a fragmentary sectional view, taken on substantially line 6—6 of Fig. 1.

As shown in the drawings, the rail B forms the outer edge rail for the two sides and ends of the roof frame, with transversely extending ribs C secured to the sides of the frame B. The ribs C are constructed of suitable sheet metal, or metal channel, being so formed as to permit the attaching of suitable flexible strips D to the underside thereof; said strips D being attached to any desired number of the ribs C to provide means for pasting or cementing the headlining E thereto.

Secured to the outer edge of the body at the upper side thereof, is a metal frame rail H. As shown in Fig. 3, the frame H is formed with laterally extending flanges from the lower side thereof, the outer flange providing means for securing the outer body panels thereto, and the inner flange providing means for securing the upper edge of the interior trimming thereto. In Fig. 4, the outer edge of the headlining E is secured to a flexible strip K, said strip K providing means for securing the headlining E to the frame B, and also providing an anti-friction shim between the frame B and frame H. After the headlining is secured to the frame B, and pasted or cemented to flanges D to prevent sagging between the ends, the roof frame is attached to the body frame H by means of suitable bolts F, or other affixing means.

The frame rails B and H are so formed as to provide a suitable channel for attaching a flexible strip J thereto. Previous to attaching said strip J within said channel, the outer edge of the deck covering A is secured to said strip J, said strip J providing means for securing said deck covering A to the roof frame.

It will be noted that the frame rail B and the ribs C provide ample supporting means for the deck covering A, so that a neat structure is provided and all of the advantages referred to, obtained, while at the same time, an extremely durable structure is presented.

While I have illustrated and described the preferred form of structure, I do not wish to limit myself to the precise form of structure shown, but desire to avail myself of such variations and modifications as come within the scope of the appended claim.

Having thus described my invention, what I claim as new and desire to secure by Letters Patent is:

A closed vehicle body having a roof frame so constructed as to form a detachable unit and positioned at the upper side of the body thereof, said roof frame comprising an outer frame-forming rail constructed of suitable metal, the upper edge of said frame-forming rail turned outwardly and downwardly so as to form the upper portion of a channel formation at the outer edge of said roof frame; a frame-forming rail at the upper and outer edge of the body, said rail being constructed of metal, and cross-sectionably representing an inverted letter T, said rail providing a suitable member for securing said roof frame thereto, and also providing the lower portion of the channel formation previously referred to; an outer deck covering of suitable fabric, a flexible strip of material secured to the outer edge of said deck covering, and within said channel formation.

THOMAS PAUL LOHRMAN.